(12) United States Patent
Kuo

(10) Patent No.: US 8,048,349 B2
(45) Date of Patent: Nov. 1, 2011

(54) METHOD FOR THE PREPARATION OF FOAMED AND CROSSLINKED RUBBER

(76) Inventor: Chun-Fu Kuo, Taichung Hsien (TW)

( * ) Notice: Subject to any disclaimer, the term of this patent is extended or adjusted under 35 U.S.C. 154(b) by 0 days.

(21) Appl. No.: 12/704,523

(22) Filed: Feb. 11, 2010

(65) Prior Publication Data

US 2011/0193254 A1  Aug. 11, 2011

(51) Int. Cl.
*B29C 44/08* (2006.01)
(52) U.S. Cl. .................. 264/55; 264/51; 264/52
(58) Field of Classification Search .............. 264/51, 264/52, 55
See application file for complete search history.

(56) References Cited

U.S. PATENT DOCUMENTS 4,671,910 A * 6/1987 Fuhrmann ................. 264/54

OTHER PUBLICATIONS

Britannica Online Encyclopedia; http://www.britannica.com/EBchecked/topic/692466/ethylene-propylene-copolymer.*

* cited by examiner

*Primary Examiner* — Yogendra Gupta
*Assistant Examiner* — Ninh Le

(57) ABSTRACT

The method of the present invention is adapted to foam and crosslink a raw material including a rubber, a crosslinking agent and a foaming agent. The method includes the following steps: (1) a first crosslinking and foaming step, placing the raw material into a first mold, crosslinking and foaming the raw material to form a pre-molded body; (2) a second crosslinking and foaming step, withdrawing the pre-molded body from the first mold, placing the pre-molded body into a second mold after the pre-molded body being cooled down, crosslinking and foaming the pre-molded body to form a molded body; and (3) a third crosslinking and foaming step, withdrawing the molded body from the second mold, placing the molded body into a heating device after the molded body being cooled down, crosslinking and foaming the molded body to form a product.

4 Claims, 4 Drawing Sheets

METHOD FOR THE PREPARATION OF FOAMED AND CROSSLINKED RUBBER

BACKGROUND OF THE INVENTION

1. Field of the Invention

The present invention relates to a method for the preparation of rubber, and more particularly to a method for the preparation of foamed and crosslinked rubber.

2. Description of the Prior Art

Rubber is a material with high resilient, good recoverability, good fatigue resistance, ski-proofing property, and abrasion proofing property, thus is has been commonly used in daily life and has become one of the most important material in the industry.

Conventional methods of preparation of foamed and crosslinked rubber include one-stage crosslinking and foaming manner, two-stage crosslinking and foaming manner, and continuous crosslinking and foaming manner.

The one-stage manner mainly includes single heating step to crosslink and foam the rubber raw material. Products made by such one-stage manner are usually limited to small size articles, low foaming degree, and low crosslinking degree.

The two-stage manner mainly includes two heating steps to crosslink and foam the rubber raw material. Specifically, the raw material is mainly shaped in the first heating step, and then is matured and enlarged in the second heating step. Products made by the two-stage manner are usually simple-structured. For example, they may be formed into a plate shape.

The continuous manner mainly includes heating the raw material continuously to crosslink and foam the rubber.

Some disadvantages are arisen in the conventional rubber preparation manners. For instance, the crosslinking degree of the rubber cannot be easily controlled, the product may be damaged while parting the product from the mold, and the patterns in the mold are not well copied on the rubber products. Other disadvantages, such as product deformation, low dimensional stability, low clearness of product contour, are also commonly seen in the conventional manners.

At the present, subsequent processing and shaping steps are provided to make up the above-mentioned unsatisfied shaping result.

However, such subsequent steps will lead to new disadvantages such as high cost, low efficiency. Besides, only a few modifications can be made to the matured rubber products since the crosslinking degree of the products is too high to be further thermally shaped. In other words, seriously modifications are not likely to be achieved on the matured rubber products during the subsequent steps.

The present invention is, therefore, arisen to obviate or at least mitigate the above mentioned disadvantages.

SUMMARY OF THE INVENTION

The main object of the present invention is to provide a three-stage crosslinking and foaming method to prepare a rubber product with better shaping results.

To achieve the above and other objects, a method of the present invention is adapted to foam and crosslink a raw material including a rubber, a crosslinking agent and a foaming agent. The method includes the following steps: (1) a first crosslinking and foaming step, placing the raw material into a first mold, crosslinking and foaming the raw material to form a pre-molded body, the pre-molded body having a crosslinking degree of 2-10% and a foaming degree of less than 10%, the pre-molded body having a rough shape given by the first mold; (2) a second crosslinking and foaming step, withdrawing the pre-molded body from the first mold, placing the pre-molded body into a second mold after the pre-molded body being cooled down, crosslinking and foaming the pre-molded body to form a molded body, the molded body has a foaming degree of less than 50%, the pre-molded body expanding to entirely fill the second mold, the molded body having a clear contour given by the second mold; and (3) a third crosslinking and foaming step, withdrawing the molded body from the second mold, placing the molded body into a heating device after the molded body being cooled down, crosslinking and foaming the molded body to form a product, the product has a crosslinking degree of more than 90% and a foaming degree of 100%.

According to the three-stage rubber preparation method, the crosslinking degree of the intermediate rubber material is well controlled, so as to produce a rubber product with high dimension stability and clearness of product contour. Accordingly, the product value can be increased, and the market requirements can be appropriately satisfied.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2-1 is a diagram showing relationships of torque values of intermediate rubber products at different temperature to reaction time;

FIG. 2-2 is a diagram showing relationships of gas generations of intermediate rubber products at different temperature to reaction time.

DETAILED DESCRIPTION OF THE PREFERRED EMBODIMENTS

Figure 1:
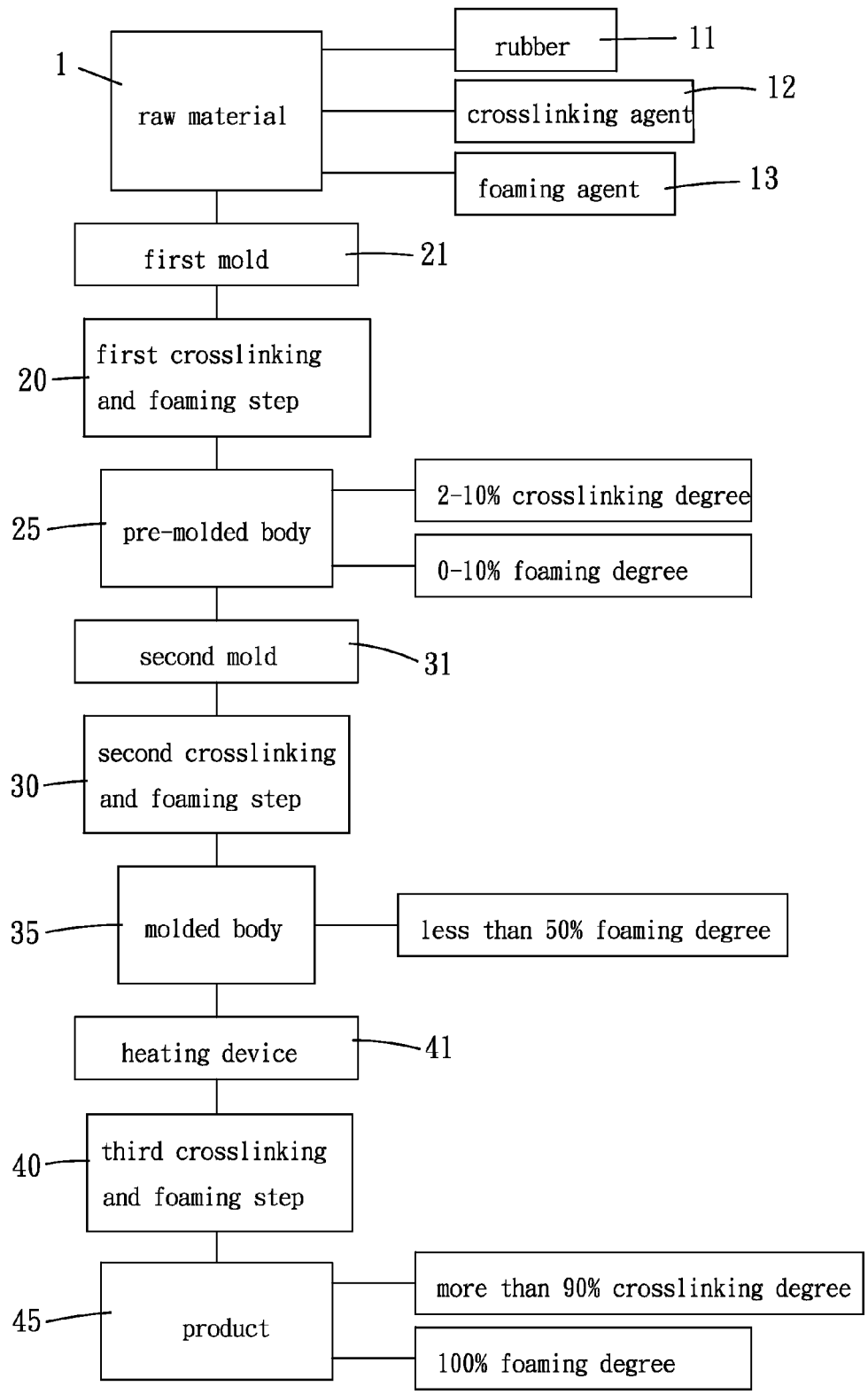
FIG. 1 is a flow chart showing a method in accordance with a preferred embodiment of the present invention.

First, please refer to FIG. 1 for a preferred embodiment of the present invention. A method for the preparation of foamed and crosslinked rubber of the present invention is adapted to foam and crosslink a raw material 1. The raw material 1 is selected based on the physical properties of the desired product and includes a rubber 11, a crosslinking agent 12, a foaming agent 13 and other additives such as a filling agent, a plasticizer, a surfactant, an activator, an oxidation inhibitor and etc. Next, setting appropriate reaction temperature and time for the raw material 1, and fine adjusting the raw material in the manner of trial and error to achieve an optimum crosslinking and foaming process. Because the method of the present invention relates to the crosslinking and foaming process of the rubber raw material, the approaches of setting the reaction temperature and time is also discussed hereinafter.

Figure 2:
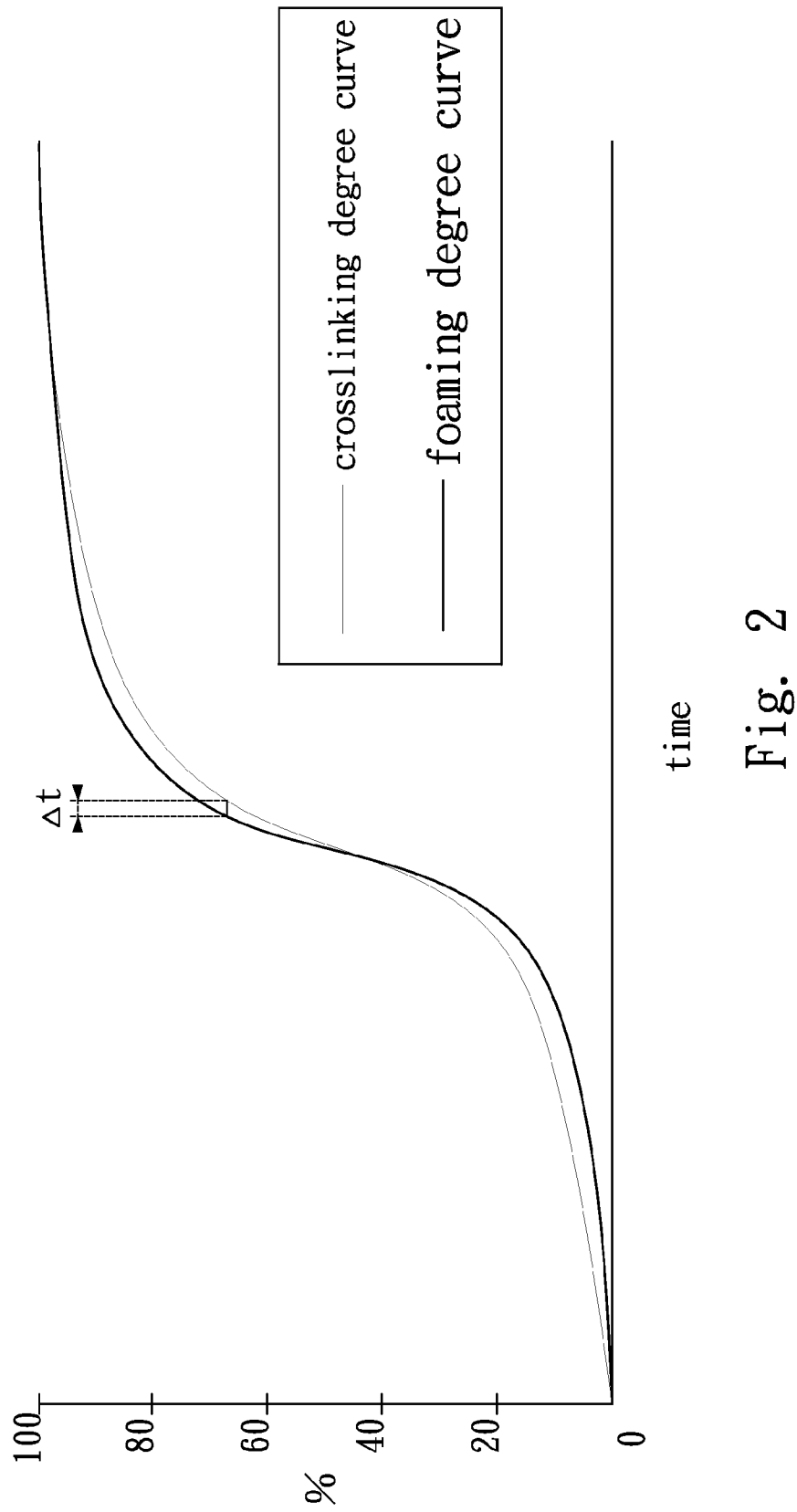
FIG. 2 is a diagram showing relationships of the crosslinking degree/foaming degree of an intermediate rubber product to reaction time, at a predetermined temperature.
Figures 1, 2:
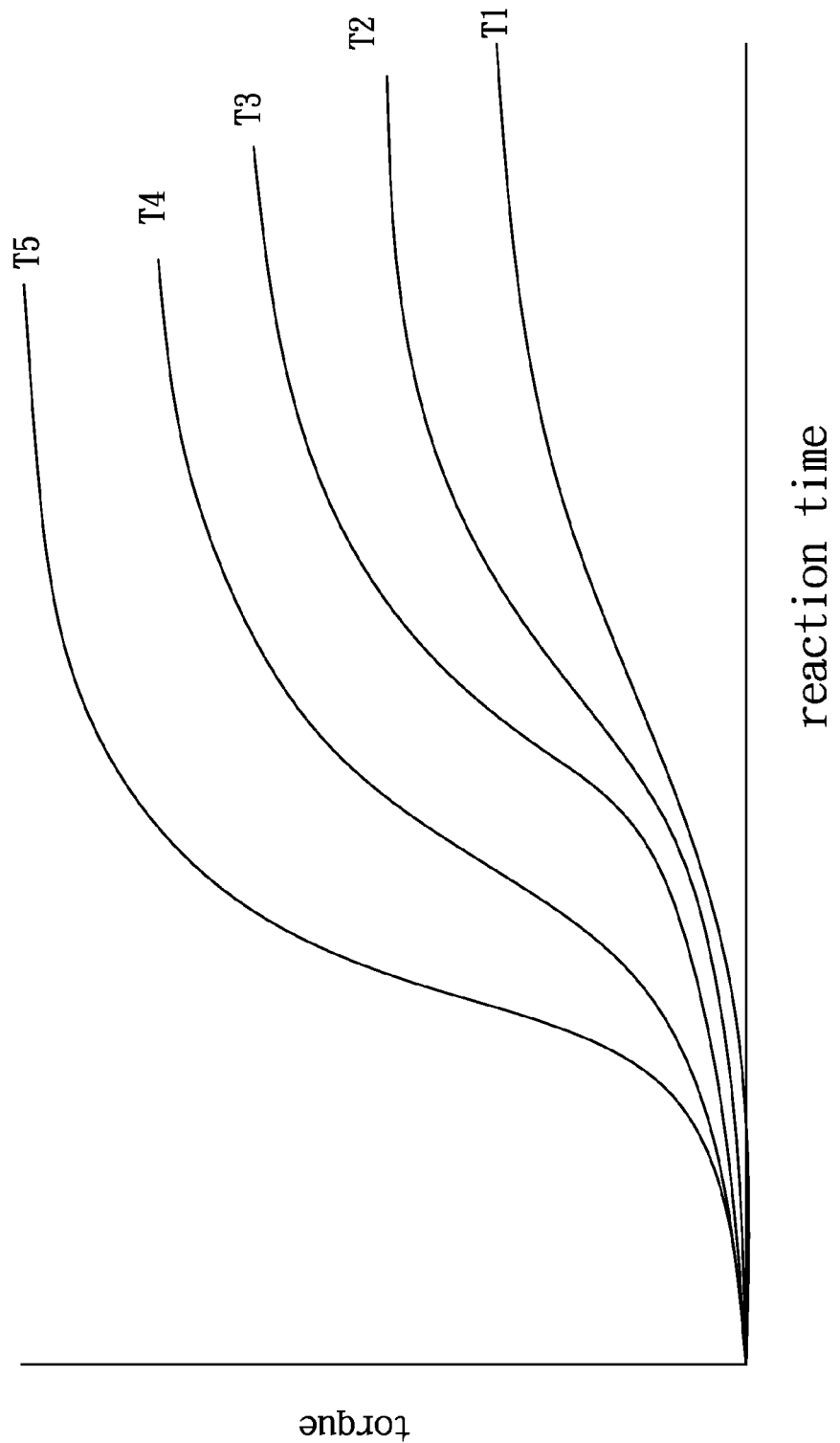
Figure 2:
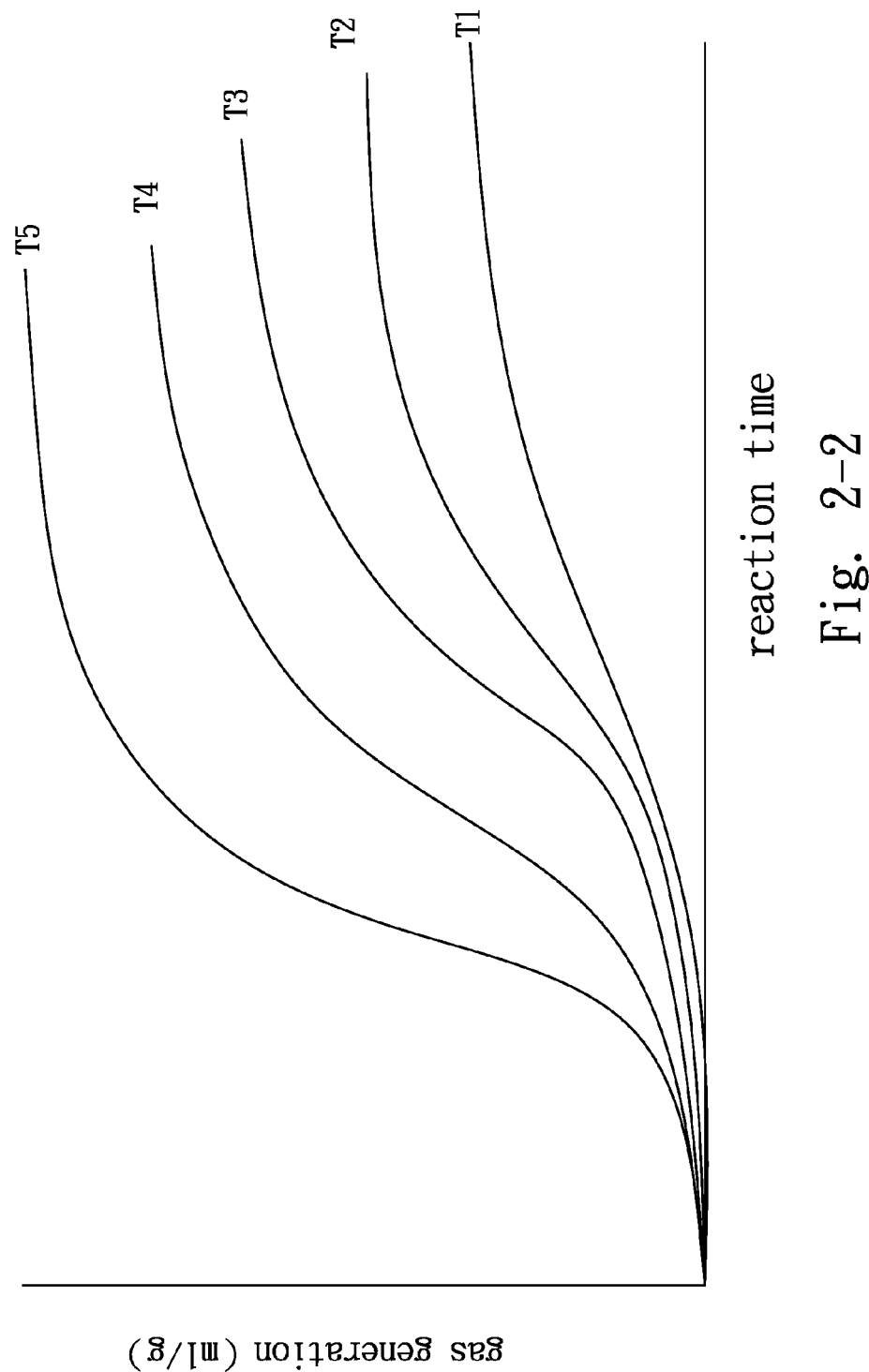

Please refer to FIG. 2 for a diagram showing relationships of crosslinking degree and foaming degree of an intermediate rubber product to the reaction time, at a predetermined temperature. In the diagram, two curves, i.e. a curve of crosslinking degree and a curve of foaming degree, are depicted. In an optimum state, the two curves are substantially identical or at least very close to each other, so that the crosslinking and foaming process can be best controlled. More specifically, the optimum crosslinking and foaming process includes minimizing Δt of FIG. 2, which is a time difference between the two curves. In order to minimize Δt, the raw material, as well as the reaction temperature and time, should be appropriate chosen. The determination of reaction temperature and time may be made based on FIG. 2-1 and FIG. 2-2, in which FIG. 2-1 is a diagram showing relationships of torque values of intermediate rubber products at different temperature to reaction time, and FIG. 2-2 is a diagram showing relationships of gas generations of intermediate rubber products at different temperature to reaction time. In FIG. 2-1 and FIGS. 2-2, T1 to T5 indicate different temperatures, which satisfy the following relationship:

$$T5>T4>T3>T2>T1;$$

Based on FIG. 2-1 and FIG. 2-2, the higher the temperature is, the faster the increasing rate of the torque value and the gas generation value is, and the shorter the required reaction time is. The reaction temperature and time of the present invention is determined based on the torque value factor and gas generation factor shown in the relationships of FIG. 2-1 and FIG. 2-2. Thus the crosslinking and foaming process can be divided into three stages to control the crosslinking degree and the foaming degree. Accordingly, the shaping results can be significantly elevated, and physical properties of the desired rubber product can be satisfied.

Note that the crosslinking degree can be examined by the torque value, and the foaming degree can be, on the other hand, examined by the gas generation value. A crosslinking degree of the product is assumed to be 100%, and a foaming degree thereof is also assumed to be 100% and is calculated based on a dimension ratio by dividing a first value, which is gained by subtracting the original volume of the original raw material from the volume of the intermediate rubber product, by a second value, which is gained by subtracting the original volume of the original raw material from the volume of the mature rubber product.

After the raw material 1 is thoroughly mixed, the raw material 1 is placed in the first mold 21. The first crosslinking and foaming step 20 is thus underwent at a predetermined temperature and reaction time to crosslink and foam the raw material 1 to form a pre-mold body 25 (a rubber intermediate product being preliminarily molded), which has a crosslinking degree of 2-10% and a foaming degree of less than 10%. In the present step, the pre-molded body 25 is preliminarily crosslinked, so the pre-molded body 25 has little flowability. The first mold 21 gives the pre-molded body 25 a rough shape since the raw material expand to fill up the first mold. Nevertheless, the crosslinking degree of the pre-molded body 25 is still low, so that the pre-molded body 25 is capable of being further thermally shaped.

Thereafter, the pre-molded body 25 is parted from the first mold 25 and is cooled down. Then the pre-molded body 25 is placed into a second mold 31 and undergoes the second crosslinking and foaming step 30. That is, the pre-molded body 25 is further crosslinked and foamed at a predetermined temperature and reaction time to form a molded body 35, which has a foaming degree of less than 50% and an appropriate crosslinking degree. Because the pre-molded body 25 is substantially unflowable, the second mold 31 can be provided with at least one venting bore communicating with a cavity thereof. As such, the reaction gas will not accumulate in the cavity, and the pre-molded body 25 can, therefore, appropriately expand to substantially entirely fill the cavity. Accordingly, the patterns in the second mold 31 can be well copied. Note that if the pre-molded body 25 is still flowable, a second mold with venting bores will cause leakage problems. In addition, the pre-molded body 25 can still be appropriately molded into a complex shape due to its low crosslinking degree.

As such, the molded body 35 can finely copy the patterns and shape of the second mold 31 and have a clear contour. The foaming degree of the molded body 35 is selected to be lower than 50%, so as to easily control the foaming process, to achieve an appropriate crosslinking degree, and to further get better shaping results.

And then, the molded body 35 is withdrawn from the second mold 31 and is cooled down again. Thereafter the molded body 35 is placed in a heating device and undergoes the third crosslinking and foaming step 40 at a predetermined temperature and time, so as to mature and enlarge the molded body 35 to produce a final product 45 with a foaming degree of 100% and an optimum crosslinking degree, which depends on the selection of raw material, reaction temperature and time and is preferably more than 90%. Because the molded body 35 already has a considerable crosslinking degree, the shape and the patterns thereof are not distorted during the third crosslinking and foaming step 40. That is, the stability of the product dimension is ensured, and the contour is still clear.

In the third crosslinking and foaming step 40, the heating device 41 may be an open or a close heating device. The open heating device may be a heating conveyer belt or an oven. That is, the product is unbounded in the open heating device. The close heating device may be a third mold, which can also have some venting bores to reduce the inmold pressure as well as to increase the molding property.

Note that the reaction temperature of the third crosslinking and foaming step is not necessarily higher than that of the second crosslinking and foaming step, and the reaction temperature of the second crosslinking and foaming step is not necessarily higher than that of the first crosslinking and foaming step as well. Specifically, the reaction temperature and time of the steps are chosen based on the selection of the raw material and the process requirement. FIG. 2-1 and FIG. 2-2 are used to help determine the reaction temperature and time, as discussed hereinabove, so as to reach the desired crosslinking degree and/or foaming degree of the intermediate rubber products.

In summarization, the disadvantages, such as product deformation, low dimensional stability and low clearness of product contour, can be significantly mitigated by the three-stage rubber crosslinking and foaming method of the present invention. A product with a more complex figure can be easily achieved in the present invention, since the crosslinking degree and the foaming degree is precisely controlled in different steps.

What is claimed is:

1. A method for the preparation of foamed and crosslinked rubber, being adapted to foam and crosslink a raw material comprising a rubber, a crosslinking agent and a foaming agent, the method comprising the following steps:

(1) a first crosslinking and foaming step, placing the raw material into a first mold, crosslinking and foaming the raw material to form a pre-molded body, the pre-molded body having a crosslinking degree of 2-10% and a foaming degree of less than 10%, the pre-molded body having a rough shape given by the first mold;

(2) a second crosslinking and foaming step, withdrawing the pre-molded body from the first mold, placing the pre-molded body into a second mold after the pre-molded body being cooled down, crosslinking and foaming the pre-molded body to form a molded body, the molded body has a foaming degree of less than 50%, the pre-molded body expanding to entirely fill the second mold, the molded body having a clear contour given by the second mold; and (3) a third crosslinking and foaming step, withdrawing the molded body from the second mold, placing the molded body into a heating device after the molded body being cooled down, crosslinking and foaming the molded body to form a product, the product has a crosslinking degree of more than 90% and a foaming degree of 100%.

2. The method of claim 1, wherein the second mold defines a cavity for the pre-molded body to crosslink and foam therein and has at least one venting bore communicating with the cavity.

3. The method of claim 1, wherein the heating device is an open heating device.

4. The method of claim 1, wherein the heating device is a close heating device.

* * * * *